United States Patent [19]
Eckberg et al.

[11] Patent Number: 6,074,703
[45] Date of Patent: Jun. 13, 2000

[54] FLUOROSILICONE COATINGS

[75] Inventors: Richard Paul Eckberg, Saratoga Springs; Edwin Robert Evans; Melvin Richard Toub, both of Clifton Park, all of N.Y.

[73] Assignee: General Electric Company, Pittsfield, Mass.

[21] Appl. No.: 09/298,061

[22] Filed: Apr. 22, 1999

Related U.S. Application Data

[62] Division of application No. 09/058,696, Apr. 10, 1998, Pat. No. 5,919,526, which is a division of application No. 08/791,239, Jan. 30, 1997, Pat. No. 5,753,318, which is a division of application No. 08/273,515, Jul. 11, 1994, Pat. No. 5,616,403.

[51] Int. Cl.$^7$ ........................................................ B05D 3/02
[52] U.S. Cl. ........................................ 427/387; 427/393.5
[58] Field of Search .................................. 427/387, 393.5

[56] References Cited

U.S. PATENT DOCUMENTS

| | | |
|---|---|---|
| 4,029,629 | 6/1977 | Jeram . |
| 4,288,345 | 9/1981 | Ashby et al. . |
| 4,339,564 | 7/1982 | Okamura . |
| 4,375,523 | 3/1983 | Hatanaka et al. . |
| 4,465,805 | 8/1984 | Blizzard et al. . |
| 4,487,906 | 12/1984 | Kniege et al. . |
| 4,539,357 | 9/1985 | Bobear . |
| 4,624,900 | 11/1986 | Fau . |
| 4,882,368 | 11/1989 | Elias et al. . |
| 5,059,668 | 10/1991 | Fukuda et al. . |
| 5,081,172 | 1/1992 | Chaffee et al. . |
| 5,166,294 | 11/1992 | Kishita et al. . |
| 5,178,959 | 1/1993 | Eckberg et al. . |
| 5,204,436 | 4/1993 | Kishita et al. . |
| 5,225,504 | 7/1993 | Tatsu et al. . |
| 5,340,488 | 8/1994 | Adams et al. . |
| 5,340,866 | 8/1994 | Evans . |

FOREIGN PATENT DOCUMENTS

| | | |
|---|---|---|
| 0 169 098 A1 | 1/1986 | European Pat. Off. . |
| 0 263 649 A2 | 4/1988 | European Pat. Off. . |
| 0 337 790 A2 | 10/1989 | European Pat. Off. . |
| 0 342 809 A2 | 11/1989 | European Pat. Off. . |
| 342809 | 11/1989 | European Pat. Off. . |
| 0 458 617 A2 | 11/1991 | European Pat. Off. . |
| 0 510 874 A1 | 10/1992 | European Pat. Off. . |
| 510874 | 10/1992 | European Pat. Off. . |
| 0 655 483 A1 | 5/1995 | European Pat. Off. . |
| 655483 | 5/1995 | European Pat. Off. . |
| 2 096 631A | 10/1982 | United Kingdom . |
| 2096631 | 10/1982 | United Kingdom . |

*Primary Examiner*—Erma Cameron

[57] ABSTRACT

The present invention relates to the use of a thin fluorosilicone elastomer coating as a cost effective solution to the oil weepage problem while retaining the sealing advantages of silicone rubber.

17 Claims, No Drawings

FLUOROSILICONE COATINGS

This is a divisional of application Ser. No. 09/058,696, now U.S. Pat. No. 5,919,526 filed on Apr. 10, 1998, which is a divisional of Ser. No. 08/791,239 filed on Jan. 30, 1997, now issued U.S. Pat. No. 5,753,318, which is a divisional of Ser. No. 08/273,515 filed on Jul. 11, 1994, now issued U.S. Pat. No. 5,616,403.

The present invention relates to fluorosilicone coatings. More particularly, the present invention relates to a method of coating fluorosilicone elastomer on a nonfluorosilicone substrate to substantially reduce oil permeability.

BACKGROUND OF THE INVENTION

Over the past ten years, molded silicone rubber has been used in various automotive sealing applications such as valve rocker cover and oil pan gaskets. The reason for this development is to be found in the outstanding properties of silicones. As is well-known, silicones have high temperature stability and cold temperature flexibility in conjunction with low stress relaxation and ease of fabrication. Heat cured silicone rubber compounds have a proven track record in engine sealing applications and have provided the longevity of service required by the automotive community.

Recently the automotive manufacturers have experienced some problems in oil permeability, known as "weepage". Silicone rubber gaskets have a propensity to weep motor oil through the rubber, resulting in accumulation of oil on the outside surface of the engine. Although this does not result in gross leakage, it causes an unsightly slick which has become a significant component of engine warranty costs.

One approach which has been shown to moderately reduce weepage in methyl vinyl silicone compounds is the incorporation of relatively large amounts of extending fillers. Unfortunately this adversely impacts the physical properties and renders gaskets molded from these materials unsuitable for use in cam cover sealing applications which use plastic composite covers. This is due to unacceptable increase in compressive modulus which causes the covers to crack under load. In addition, the reduction in weepage is only partial which does not satisfactorily resolve the problem.

Another approach is to use gaskets made from fluorosilicone elastomers. It has been shown by the major silicone suppliers and gasket fabricators that fluorosilicone elastomers as a special category of silicones do not exhibit oil weepage. However, gaskets from fluorosilicone elastomers are more expensive to fabricate than gaskets from silicone gaskets. Further since fluorosilicones are halogenated elastomers, disposal of the fluorosilicone gaskets may give rise to environmental concerns. Thus there is a need for automobile gaskets which minimizes the fluorosilicone content but offers substantial reduction to oil weepage.

SUMMARY OF THE INVENTION

The present invention is based upon the discovery that a thin fluorosilicone elastomer coated on a substrate can substantially reduce the oil permeability of the substrate.

According to the present invention, a method for substantially reducing oil permeability, comprising the steps of (a) applying a curable fluorosilicone coating to a substrate; and (b) curing the fluorosilicone coating on the substrate.

The fluorosilicone coating comprises vinyl-containing fluorosilicone, hydrogen-containing siloxane, and a catalytic amount of platinum group hydrosilation catalyst. In addition, an effective amount of organic peroxide can be added to improve the state of cure.

The present invention is further directed to a substrate with fluorosilicone elastomer coated thereon, wherein the fluorosilicone coating has a thickness of 0.1–10 mil.

DESCRIPTION OF THE PREFERRED EMBODIMENT

The fluorosilicone coating of the present invention comprises vinyl-containing fluorosilicone composition, hydrogen-containing siloxane and a catalytic amount of platinum group hydrosilation catalyst. The vinyl-containing fluorosilicone composition can be either fluorosilicone homopolymers or fluorosilicone copolymers whose fluorosilicone contents are at least 80 mole percent in order to exhibit a desired high resistance to oil permeation, more preferably more than 95 mole percent, and most preferably 99 mole percent.

A hydrogen-containing siloxane is a component of the fluorosilicone coating. The hydrogen-containing siloxane can be any of the currently known organohydrogenpolysiloxanes having an average of at least two, preferably three silicon-bonded hydrogen atoms in each molecule and functions as a crosslinker for the fluorosilicone composition.

In order to form a curable rubber, additional cure catalysts are provided. The catalysts include all of the well know platinum-group hydrosilation catalysts which are substantially free of inhibitory effect and are effective for catalyzing the reaction of silicon-bonded hydrogen atoms with silicon-bonded alkenyl radicals or hydroxyl radicals. A particular useful platinum catalyst is the platinum-siloxane catalyst, substantially free of inhibitory impurities and detectable inorganic halogen, disclosed by Ashby et al. in U.S. Pat. No. 4,288,345 (hereinafter "the Ashby platinum"), hereby incorporated by reference.

In addition, an organic peroxide free radical initiator or curing agent can be provided to improve the state of cure. The preferred peroxide curing agents are thermal decomposition organic peroxides conveniently used to cure silicone elastomers. Examples of suitable organic peroxide free radical initiators for use in the present invention are disclosed, for example, in U.S. Pat. No. 4,537,357 to Bobear which is incorporated herein by references. Suitable peroxide catalysts include dialkyl peroxide such as di-tertiary-butyl peroxide, tertiary-butyl-triethylmethyl peroxide, di-tertiary-butyl-tertiary-triphenyl peroxide, t-butyl perbenzoate and a di-tertiary alkyl peroxide such as dicumyl peroxide. A particular useful peroxide catalyst is Diacyl peroxides such as benzoyl peroxide and 2,4 dichloro benzoyl peroxide. The peroxide catalyst is used in a catalytic amount which is typically from about 0.8 to about 4.0, preferably from about 0.9 to about 3.0, and most preferably from about 2.0 to about 3.0, parts by weight per 100 parts of the fluorosilicone composition.

The fluorosilicone coating typically, but not necessarily, further comprises an appropriate quantity of a solvent or combination of solvents to provide a lower viscosity for, and hence an easier application of, the composition to various substrates. The amount of solvent is not critical; however, only a sufficient amount to facilitate the preparation, handling and applying the composition is recommended. The solvent can be any liquid that will dissolve the fluorosilicone composition and other components without adversely reacting therewith. Preferred solvents include halogenated solvents, such as chlorofluorocarbons, esters, such as ethyl acetate, ketones such as methyl ether ketone, ethers such as dibutyl ether. In addition, a solvent or combination of solvents can be used to dilute the fluorosilicone to render it sprayable.

The compositions of this invention may further comprise filler, e.g., reinforcing filler, such as fumed silica or precipitated silica; and/or extending fillers, such as zinc oxide, titanium oxide, diatomaceous earth, crystalline silica and the like. A particularly useful filler for the composition and method herein is a silica filler, preferably fumed silica.

The fluorosilicone coating of this invention can be applied to a substrate by any conventional means known in the art, e.g., by immersing the substrate in the fluorosilicone coating, or by spraying the fluorosilicone coating to the substrate. The fluorosilicone coating has a thickness of 0.1–10 mil, and more preferrably 0.5–3.0 mil.

The fluorosilicone coatings of the present invention can be cured by any means which is known in the art. For example, curing of the coatings of this invention can be accomplished by heating the coated substrate at temperatures of 350° F.–450° F. for 5–10 minutes. Certain derivatives of the compositions may also be cured by ultraviolet light or electron beam radiation. For example, UV curable epoxy-functional fluorosilicones have been disclosed by Eckberg et al. in U.S. Pat. No. 5,178,959, hereby incorporated by reference.

In order that those skilled in the art might be better able to practice the present invention, the following examples are given by way of illustration and not by way of limitation. All viscosities were measured at 25° C. Unless otherwise indicated, all parts are by weight.

EXAMPLE 1
Preparation of Fluorosilicone Solution A 10 grams of a 60 durometer fluorosilicone elastomer with approximate composition 65% fluorosilicone homopolymer, 4% methyl vinyl silicone polymer, 23% fumed silica, 6% siloxane fluid, and 2% 2,4-dichloro benzoyl peroxide paste (50% active) were dispersed in 90 grams of methyl ethyl ketone. The mixture formed a stable dispersion with solution viscosity of 25 centistokes. A 1"×2"×0.075" sample of cured 45 durometer methyl vinyl silicone rubber was briefly immersed in this solution, removed and allowed to air dry for 5 minutes. The sample was then placed in an oven at 177° F. for 15 minutes, removed from the oven and allowed to cool to room temperature. The methyl vinyl silicone rubber was evenly encapsulated in a fluorosilicone coating of thickness 0.5 mil–1.0 mil. The coating was partially cured with tacky surface and could be abraded with moderate pressure.

EXAMPLE 2
Preparation of Fluorosilicone Solution B 10 grams of a 60 durometer fluorosilicone elastomer with approximate composition 64% fluorosilicone homopolymer, 4% methyl vinyl silicone polymer, 22% fumed silica, 6% siloxane fluid, 4% methyl hydrogen siloxane fluid, and 0.3% Ashby platinum catalyst solution were dispersed in 90 grams of methyl ethyl ketone. The mixture formed a stable dispersion with solution viscosity of 21 centistokes. A 1"×2"× 0.075" sample of cured 45 durometer methyl vinyl silicone rubber was briefly immersed in this solution, removed and allowed to air dry for 5 minutes. The fluorosilicone coating was uniform, continuous and of similar thickness to that stated in Example 1 above. The sample was then placed in an oven at 177° F. for 15 minutes, removed from the oven and allowed to cool to room temperature. The coating was observed to be tightly cured with very little surface tack, could not be abraded, and adhered tenaciously to the surface of the methyl vinyl silicone rubber substrate.

EXAMPLE 3
Preparation of Fluorosilicone Solution C 10 grams of a 60 durometer fluorosilicone elastomer with approximate composition 63% fluorosilicone homopolymer, 4% methyl vinyl silicone polymer, 21% fumed silica, 6% siloxane fluid, 4% methyl hydrogen siloxane fluid, 2% 2,4-dichloro benzoyl peroxide paste and 0.3% Ashby platinum catalyst solution were dispersed in 90 grams of methyl ethyl ketone. The mixture formed a stable dispersion with solution viscosity of 21 centistokes. A 1"×2"×0.075" sample of cured 45 durometer methyl vinyl silicone rubber was briefly immersed in this solution, removed and allowed to air dry for 5 minutes. The fluorosilicone coating was uniform, continuous and of similar thickness to that stated in Example 1 above. The sample was then placed in an oven at 177° F. for 15 minutes, removed from the oven and allowed to cool to room temperature. The coating was observed to be extremely tightly cured with no surface tack, shiny in appearance, could not be abraded, and adhered tenaciously to the surface of the methyl vinyl silicone rubber substrate.

The results illustrate that the system is not curable by peroxide alone. Platinum catalyzed systems yield satisfactory tight cure. As shown in Example 3, peroxide and platinum addition cure together yields excellent result.

EXAMPLE 4

| Effect of Platinum-Group Catalyst Level on Degree of Cure | | |
|---|---|---|
| | Ex.2 | Comparative Ex. 2 |
| Fluorosilicone coating | B | B' |
| Ashby platinum (grams) | 0.007 | 0.021 |
| | Ex.3 | Comparative Ex. 3 |
| Fluorosilicone coating | C | C' |
| Ashby platinum (grams) | 0.007 | 0.021 |

The fluorosilicone coatings in comparative Examples 2 and 3 are more tightly cured than that in Examples 2–3. The fluorosilicone coating in comparative Example 3 is the best cured with no surface tack. This coating could not be scratched off. The result clearly demonstrates that higher platinum level is desirable for superior cure and the dual catalyst system (the combination of platinum and the peroxide) optimizes final cure.

EXAMPLE 5

A modified ASTM D-814 Rubber Property-Vapor Transmission of Volatile Liquids test was used to assess the effectiveness of the coating described in Example 3 in reducing weepage through methyl vinyl silicone elastomer. This test measures the permeability of liquids through an elastomeric membrane and reports the weight in grams of liquid droplets which form on the opposite surface of an elastomeric seal exposed to the test fluid on one side. Test apparatus consists of a one half pint canning jar equipped with a Kerr-type screw cap which encloses a disk of the sealing material die-cut from a flat sheet of the test elastomer. The jar was first filled with 100 ml of the test fluid, the seal affixed in place, and the test assembly then inverted such that the test fluid contacts the inside surface of the elastomeric seal. The jar was then placed in an oven for 70 hours at 250° F., removed from the oven, righted, and allowed to cool to room temperature for two hours. The outer surface of the seal was then examined for evidence of oil weepage and observations were recorded. To quantify weepage, the gross weight of the assembly was determined to 0.005 grams. The outside surface of the circular seal was then wiped clean with a tissue, and the weight was again determined. The difference in weight was oil weepage and was recorded in grams.

Samples of 45 durometer methyl vinyl silicone rubber cured sheets compression molded from commercial gasketing compound were encapsulated with a 0.5–1.0 mil thick cured coating of fluorosilicone per the teaching of Example 3 and compared to uncoated samples of the same methyl vinyl silicone rubber using the weepage test method disclosed above. Thickness of the methyl vinyl silicone molded sheet was 75–80 mil, and the test fluid was Ford 5W-30 Factory Fill Motor Oil. In addition, this test was also run on 75–80 mil molded sheets of solid fluorosilicone elastomer and on 75–80 mil molded sheets of a 65 durometer, high specific gravity, highly filled methyl vinyl silicone elastomer with the follow ing results:

| Sample Identification | Weepage (grams) | Surface Appearance |
| --- | --- | --- |
| Methyl vinyl silicone gaskets compound with 0.5–1.0 mil coating of fluorosilicone elastomer per Ex. 3 | <0.005 | No visible liquid |
| Uncoated 45 durometer, methyl vinyl silicone gasketing compound | 0.057–0.06 | Wet with large beads of oil |
| Solid fluorosilicone elastomer | 0.001 | No visible liquid |
| Uncoated, 65 durometer highly filled, high specific gravity, methyl vinyl silicone compound | 0.020 | Wet with small beads of oil |

The results demonstrate that fluorosilicone coating imparts weepage resistance to methyl vinyl silicone substrates essentially equivalent to that of solid fluorosilicone elastomer. Subsequent to oil exposure, the fluorosilicone coating continued to adhere tenaciously to the methyl vinyl silicone substrate with no evidence of delamination or deterioration.

In addition, the results indicate that for uncoated methyl vinyl silicone compounds, weepage decreases as a function of filler loading and specific gravity but is still visible and significantly greater than that for fluorosilicone coated methyl vinyl silicone substrates. Whereas highly filled, high specific gravity silicone rubber compounds have relatively poor physical properties with moderate weepage, fluorosilicone coated methyl vinyl silicone compounds display negligible weepage without incurring the adverse effects on physical properties of high filler loadings.

EXAMPLE 6

| Effect of Fluorosilicone Coating on Physical Properties of Silicone Rubber | | |
| --- | --- | --- |
|  | Uncoated | Coated (Ex. 3) |
| Shore A Durometer (pts.) | 43 | 45 |
| Tensile Strength (psi) | 1303 | 1277 |
| Elongation (%) | 778 | 821 |
| 100% Modulus (psi) | 165 | 155 |

The results clearly indicate that the fluorosilicone coating has negligible effect on the fundamental physical properties of the methyl vinyl silicone elastomer substrate.

Although specific examples of the invention have been described herein, it is not intended to limit the invention solely thereto but to include all variations and modifications falling within the spirit and scope of the appended claims.

What is claimed:

1. A method for reducing oil permeability of a substrate comprising the steps of
   (a) applying a curable fluorosilicone coating wherein the fluorosilicone coating has at least 80 mole percent fluorosilicone content to the substrate said coating comprising a vinyl-containing fluorosilicone, a hydrogen-containing siloxane, a catalytic amount of a platinum group hydrosilation catalyst and a catalytic amount of a peroxide catalyst and
   (b) curing the fluorosilicone coating on the substrate wherein said curing further comprises the step of curing the fluorosilicone coating by heat.

2. The method as defined in claim 1, wherein said curing further comprises heating the coated substrate at a temperature of about 350° F. to 450° F.

3. The method as defined in claim 2, wherein said curing further comprises heating the coated substrate for about 5 to 10 minutes.

4. The method as defined in claim 1, wherein said fluorosilicone coating has at least 95 mole percent fluorosilicone content.

5. The method as defined in claim 4, wherein said fluorosilicone coating has at least 99 mole percent fluorosilicone content.

6. The method as defined in claim 1, wherein the peroxide catalyst is benzoyl peroxide.

7. The method as defined in claim 1, wherein the peroxide catalyst is 2,4-dichloro benzoyl peroxide.

8. The method as defined in claim 1, wherein said fluorosilicone coating further comprises a filler.

9. The method as defined in claim 8, wherein the filler is fumed silica.

10. The method as defined in claim 1, wherein said fluorosilicone coating further comprises a nonreactive solvent.

11. The method as defined in claim 10, wherein the nonreactive solvent is selected from the group consisting of halogenated solvents, esters, ketones, ethers and mixtures thereof.

12. The method as defined in claim 1, wherein the cured fluorosilicone coating has a thickness of 0.1 to 10 mil.

13. The method as defined in claim 12, wherein the cured fluorosilicone coating has a thickness of 0.5 to 3.0 mil.

14. The method as defined in claim 1, wherein said hydrogen-containing siloxane has an average of three silicon-bonded hydrogen atoms in each molecule.

15. The method as defined in claim 1, wherein said peroxide catalyst is present in an amount of from about 0.8 to 4.0 parts by weight per 100 parts of the fluorosilicone coating.

16. The method as defined in claim 15, wherein said peroxide catalyst is present in an amount of from about 0.9 to about 3.0 parts by weight per 100 parts of the fluorosilicone coating.

17. The method as defined in claim 16, wherein said peroxide catalyst is present in an amount of from about 2.0 to about 3.0 parts by weight per 100 parts of the fluorosilicone coating.

* * * * *